United States Patent
Lee (10) Patent No.: US 7,360,224 B2
(45) Date of Patent: Apr. 15, 2008

(54) SPRINGING DEVICE WHICH FACILITATES OPENING AND CLOSING THE APERTURE OF AN OPTICAL DISC DRIVE

(75) Inventor: Cheng-Fu Lee, Taipei (TW)

(73) Assignee: Lite-On It Corporation, Taipei (TW)

( * ) Notice: Subject to any disclaimer, the term of this patent is extended or adjusted under 35 U.S.C. 154(b) by 444 days.

(21) Appl. No.: 11/046,871

(22) Filed: Feb. 1, 2005

(65) Prior Publication Data

US 2005/0188386 A1 Aug. 25, 2005

(30) Foreign Application Priority Data

Feb. 25, 2004 (TW) .............................. 93104848 A (51) Int. Cl.
*G11B 17/03* (2006.01)

(52) U.S. Cl. ..................................... 720/601

(58) Field of Classification Search .................. None
See application file for complete search history.

(56) References Cited

U.S. PATENT DOCUMENTS

| | | | | |
|---|---|---|---|---|
| 4,530,081 A | * | 7/1985 | Sakurai et al. | 720/647 |
| 4,669,076 A | * | 5/1987 | Broom et al. | 720/706 |
| 4,882,722 A | * | 11/1989 | Matsuura et al. | 720/601 |
| 5,065,004 A | * | 11/1991 | Mizuno et al. | 235/479 |
| 5,351,228 A | * | 9/1994 | Kanno et al. | 720/647 |
| 5,517,478 A | * | 5/1996 | Park | 720/647 |
| 5,912,870 A | * | 6/1999 | Kanno et al. | 720/643 |
| 6,028,832 A | * | 2/2000 | Hojo et al. | 720/647 |
| 6,101,160 A | * | 8/2000 | Busch et al. | 720/647 |
| 6,169,720 B1 | * | 1/2001 | Kamemura et al. | 720/605 |
| 2006/0179443 A1 | * | 8/2006 | Koyama et al. | 720/601 |

\* cited by examiner

*Primary Examiner*—David Davis
(74) *Attorney, Agent, or Firm*—Bacon & Thomas, PLLC (57) ABSTRACT

A springing device including a moveable piece and an elastic object is provided. The moveable piece is disposed between the aperture and the tray and is able to swing. The first end of the moveable piece is pivotally connected to the internal of the casing and the pivotal connection is used as a supporting point of swinging, the second end of the moveable piece is pivotally connected to the baffler. The elastic object is connected to the moveable piece. When the tray is disposed within the optical disc drive, the elastic object sustains the moveable piece and the baffler, enabling the baffler to close the aperture. When the tray moves towards the aperture until touching the moveable piece, the moveable piece, which receives a force and swings, will apply a force onto the elastic object and move the baffler to slide, enabling the baffler to open the aperture.

14 Claims, 6 Drawing Sheets

SPRINGING DEVICE WHICH FACILITATES OPENING AND CLOSING THE APERTURE OF AN OPTICAL DISC DRIVE

This application claims the benefit of Taiwan Application Serial No. 093104848, filed Feb. 25, 2004, the subject matter of which is incorporated herein by reference.

BACKGROUND OF THE INVENTION

1. Field of the Invention

The invention relates in general to a springing device, and more particularly to a springing device, which facilitates to open and close the aperture of an optical disc drive.

2. Description of the Related Art

Figure 1:
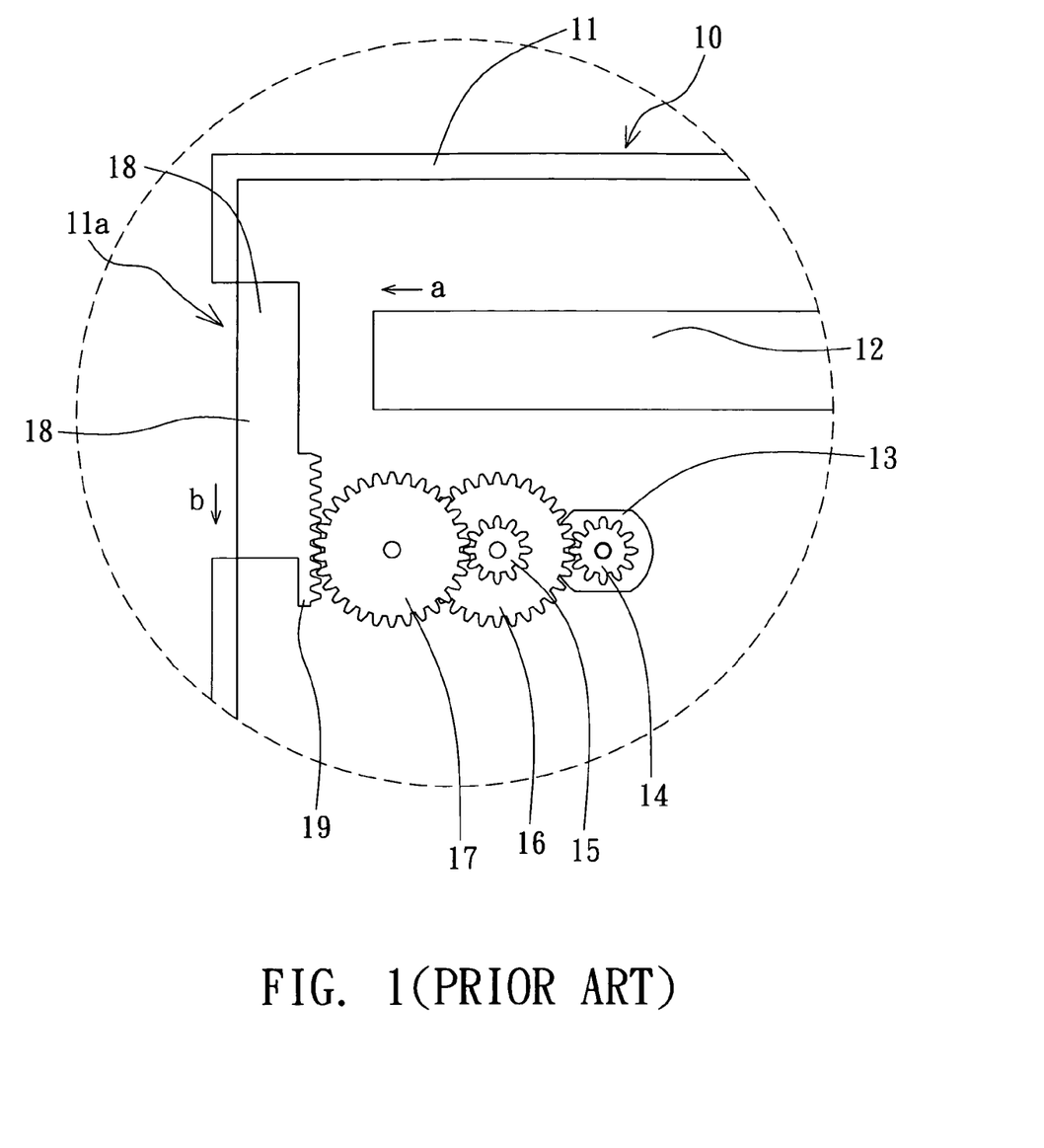
FIG. 1 is a partial cross-sectional view of a conventional optical disc drive.

Referring to FIG. 1, a partial cross-sectional view of a conventional optical disc drive is shown. In FIG. 1, a conventional optical disc drive 10 at least includes a casing 11, a tray 12, a drive motor (not shown in FIG. 1), a motor 13, a gear assembly and a baffler 18. The casing has an aperture 11a. Driven by the drive motor, the tray 12 is loaded into or withdrawn from the optical disc drive 10 through the aperture 11a. The tray 12 moveably disposed within the optical disc drive 10 is used for carrying an optical disc into or out of the optical disc drive 10. The gear assembly includes a driving gear 14 and a plurality of driven gears 15, 16 and 17, which are engaged one by one. Driven by the motor 13, the driving gear 14 is rotated, and the driven gears 15, 16 and 17, which are driven by the driving gear are rotated at the same time. The baffler 18 disposed at the inner wall of the aperture 11a, and the tooth groove 19 positioned on the baffler 18 is engaged with the driven gear 17. When the tray 12 is disposed within the optical disc drive 10, while the baffler 18 is disposed at the aperture 11a to close the aperture 11a. When the tray 12 is moved along direction a, the gear assembly driven by the motor 13 is rotated accordingly, bringing the baffler 18 to move along direction b via the tooth groove 19. Consequently, the aperture 11a is opened and the tray 12 is withdrawn to be outside the optical disc drive 10.

According to the above disclosure, the conventional optical disc drive opens or closes the aperture by means of the mechanism of a motor and a gear assembly. The motor and the gear assembly are not only expensive in terms of manufacturing cost, but also likely to break down when parts are damaged. Consequently, the manufacturing and maintenance costs are both high, yet the lifespan is shortened.

SUMMARY OF THE INVENTION

It is therefore an object of the invention to provide a mechanic springing device to open and close the aperture of an optical disc drive. It not only allows to dispense with the use of expensive and high-failure rate parts such as motor and gear box, but also to reduce the manufacturing and maintenance cost and prolonging the lifespan of the device.

According to another object of the invention, a springing device disposed in an optical disc drive is provided. The optical disc drive includes at least a casing, a tray and a baffler. The casing has an aperture. The baffler is slideably disposed at an inner wall of the casing for opening or closing the aperture. The springing device includes a moveable piece and an elastic object. The moveable piece is disposed between the aperture and the tray and is able to swing. The moveable piece has a first end and a second end corresponding to each other, wherein the first end of the moveable piece is pivotally connected to the internal of the casing and the pivotal connection is used as a supporting point for the moveable piece to swing, the second end of the moveable piece is pivotally connected to the baffler. One end of the elastic object is connected to the moveable piece while the other end is fixed at the internal of the casing. In natural state, the tray is disposed within the optical disc drive, while the elastic object sustains the moveable piece and the baffler for the baffler to close the aperture. When the tray moves towards the aperture until touching the moveable piece, the moveable piece, which receives a force and swings, will apply a force onto the elastic object and move the baffler to open the aperture.

According to another object of the invention, an optical disc drive is provided. The optical disc drive includes at least a casing, a baffler, a tray, a motor, a moveable piece and an elastic object. The casing has an aperture. The baffler is slideably disposed at an inner wall of the casing for opening or closing the aperture. The tray is moveably disposed within the casing for carrying an optical disc to be fed into or withdrawn from the casing. The motor is for driving the tray. The moveable piece is disposed between the aperture and the tray and is able to swing. The moveable piece has a first end and a second end corresponding to each other, wherein the first end of the moveable piece is pivotally connected to the internal of the casing and the pivotal connection is used as a supporting point for the moveable piece to swing, the second end of the moveable piece is pivotally connected to the baffler. One end of the elastic object is connected to the moveable piece while the other end is fixed at the internal of the casing. In natural state, the tray is disposed within the optical disc drive; the elastic object sustains the moveable piece and the baffler for the baffler to close the aperture. When the motor drives the tray to move towards the aperture until touching the moveable piece, the moveable piece, which receives a force and swings, will apply a force onto the elastic object and move the baffler to slide, enabling the baffler to open the aperture. When the motor drives the tray to be fed into the casing, the tray is detached from the moveable piece, the elastic object will provide an elasticity force which moves the moveable piece to swing and moves the baffler to slide, enabling the baffler to close the aperture.

Other objects, features, and advantages of the invention will become apparent from the following detailed description of the preferred but non-limiting embodiments. The following description is made with reference to the accompanying drawings.

DETAILED DESCRIPTION OF THE INVENTION

The First Embodiment

Figure 2:
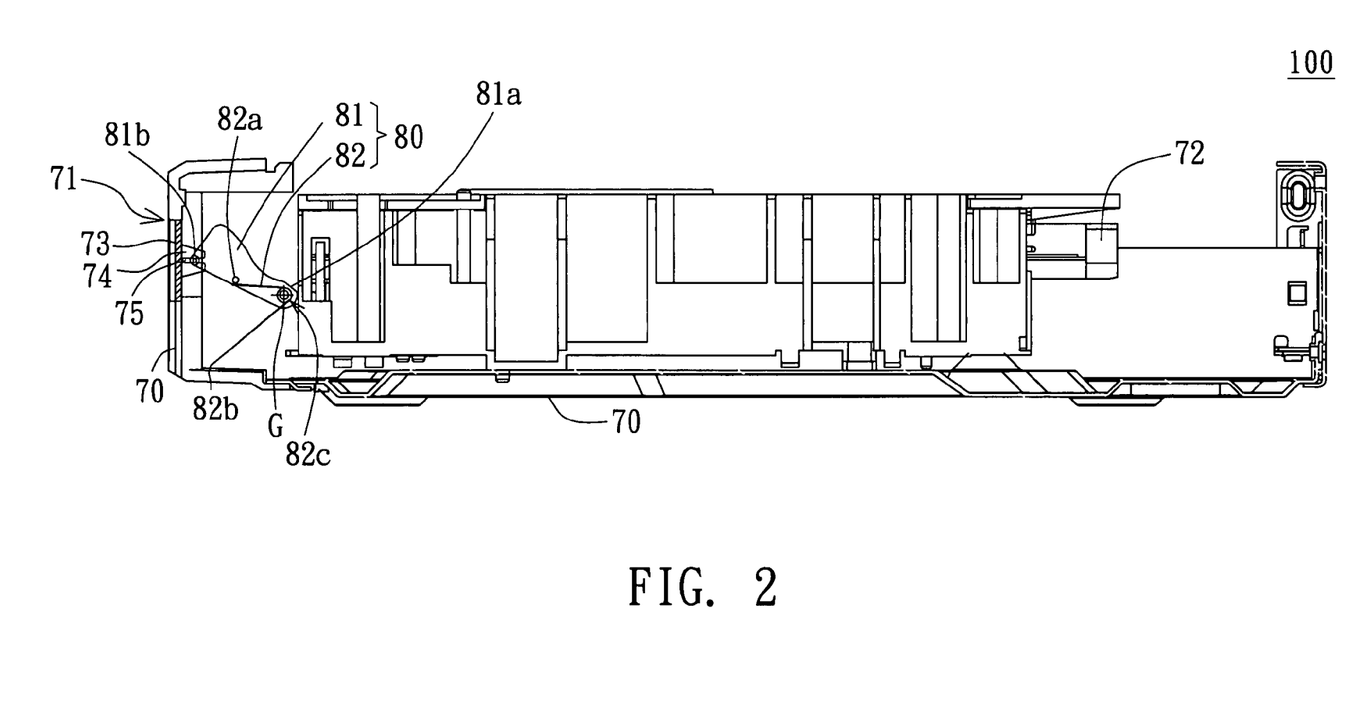
FIG. 2 is a side view of an optical disc drive according to embodiment one of the invention.

Referring to FIG. 2, a side view of an optical disc drive according to embodiment one of the invention is shown. Optical disc drive 100 includes at least a casing 70, a baffler 73, a tray 72, a drive motor (not shown here) and a springing device 80. The casing 70 has an aperture 71. The tray 72 is moveably disposed within the casing 70 for carrying an optical disc to be fed into or withdrawn from the optical disc drive 100 via the aperture 71. The tray 72 driven by the drive motor is transported into or withdrawn from the optical disc drive 100. The baffler 73 is moveably disposed at an inner wall of the casing 70 for opening or closing the aperture 71. The springing device 80 includes a moveable piece 81 and an elastic object 82. The swingable moveable piece 81 has a first end 81a and a second end 81b corresponding to each other. The first end 81a of the moveable piece 81 is pivotally connected to the internal of the casing 70, and the pivotal connection thereof is used as a supporting point G of swinging. The second end 81b of the moveable piece 81 is pivotally connected to the baffler 73. The elastic object 82 has a third end 82a and a fourth end 82b. The third end 82a of the elastic object 82 is connected to the moveable piece 81, while the fourth end 82b of the elastic object 82 is fixed at the internal of the casing 70. The elastic object 80 is illustrated by example of a spring in the present embodiment. However, when it comes to practical application, other elastic elements such as a spring piece, a paper clip or a tensional spring can also be used to achieve the same effect.

Figure 3A:
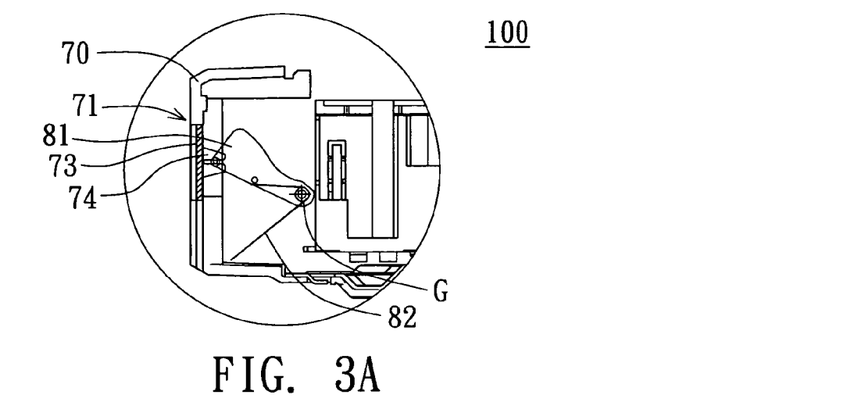
FIG. 3A is a partial view of the optical disc drive in FIG. 2 when a tray is disposed within an optical disc drive.
Figure 3B:
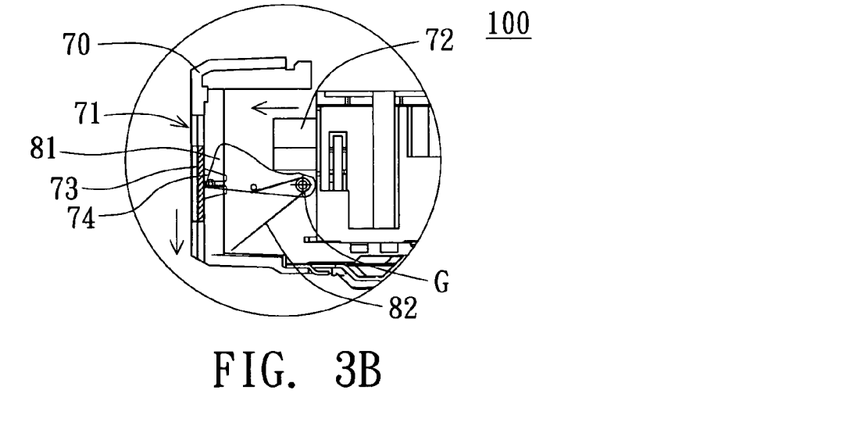
FIG. 3B is a partial view of the optical disc drive in FIG. 2 when the tray starts to be withdrawn from the optical disc drive.
Figure 3C:
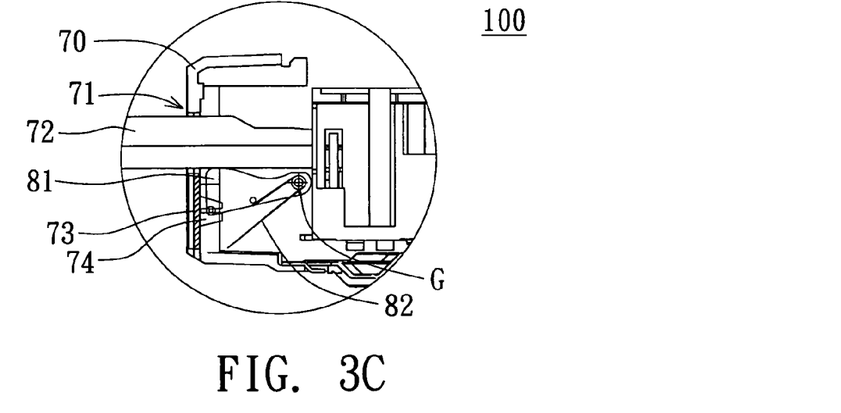
FIG. 3C is a partial view of the optical disc drive in FIG. 2 when the tray is disposed outside the optical disc drive.

Referring to FIG. 3A, a partial view of the optical disc drive in FIG. 2 when the tray is disposed within an optical disc drive is shown. In FIG. 3A, the tray 72 is disposed within the optical disc drive 100, while the moveable piece 81 and the baffler 73 is sustained by the elastic object 82, so that the baffler 73 is used for closing the aperture 71. Referring to FIG. 3B, a partial view of the optical disc drive in FIG. 2 when the tray is started to be withdrawn from the optical disc drive is shown. The tray 72 is driven to move towards the aperture 71, touching the moveable piece 81, and applying a force onto the moveable piece 81. Being pivotally connected to the internal of the casing 70, the moveable piece 81a, is pivoted on the supporting point G to swing downward. At the same time, the elastic object 82 is extended, and the baffler 73 is moved to slide. By means of the movements of the moveable piece 81 and the elastic object 82, once the tray 72 starts to move away from the optical disc drive, the aperture 71 will be opened along with the sliding of the baffler 73. Referring to FIG. 3C, a partial view of the optical disc drive shown in FIG. 2 when the tray 72 is disposed outside the optical disc drive. When the tray 72 is moved outside the casing 70, a force provided by the tray 72 is continually applied onto the moveable piece 81. Meanwhile, the second end 81b of the moveable piece 81 reaches the maximum span of swinging, so that the elastic object 82 is extended to the largest extent, carrying the baffler 73 to slide to the lowest position. Consequently, the aperture 71 is totally opened allowing the tray 72 to be released from the aperture 71.

Moreover, the elastic object 82 further comprises a bow portion 82c passing round the supporting point G. The third end 82a of the elastic object 82 is fixed onto the moveable piece 81, and the fourth end 82b of the elastic object 82 is fixed at the internal of the casing 70 to provide a restoring force when the moveable piece 81 swings. When the tray 72 is moved towards the internal of the optical disc drive 100, the tray 72 is gradually detached from the moveable piece 81 to release the extended elastic object 82, providing a restoring force for the moveable piece 81 to swing so that the baffler 73 can swing back to the original position to close the aperture 71.

Figure 4:
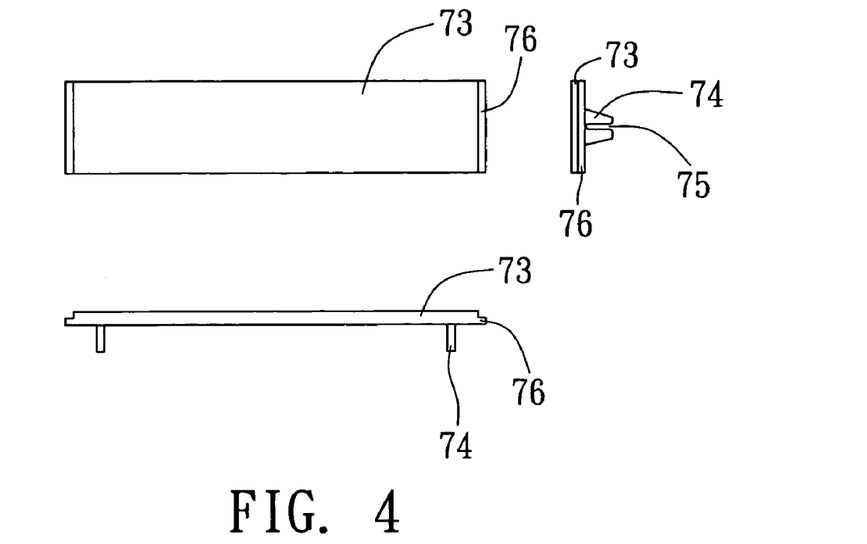
FIG. 4 shows a top view, a side view and an upward view of the baffler of an optical disc drive.

Referring to FIG. 4, a top view, a side view and an upward view of the baffler of an optical disc drive is shown. In the springing device 80, the baffler 73 includes a projecting piece 74 for pivotally connecting the moveable piece 81 and the baffler 73, so that the baffler 73 can open and close the aperture 71. Furthermore, the projecting piece 74 is pivotally connected to the second end of the moveable piece 81b via the slit jaw 75. When the moveable piece 81 swings back and forth around the supporting point G, the second end 81b of the moveable piece 81 moves relatively closer to or farther from the baffler 73. So, the slit jaw 75 provides a buffer space for the moveable piece 81 to swing back and forth. When swinging, the second end 81b of the moveable piece 81 is slided within the slit jaw 75.

Figure 5:
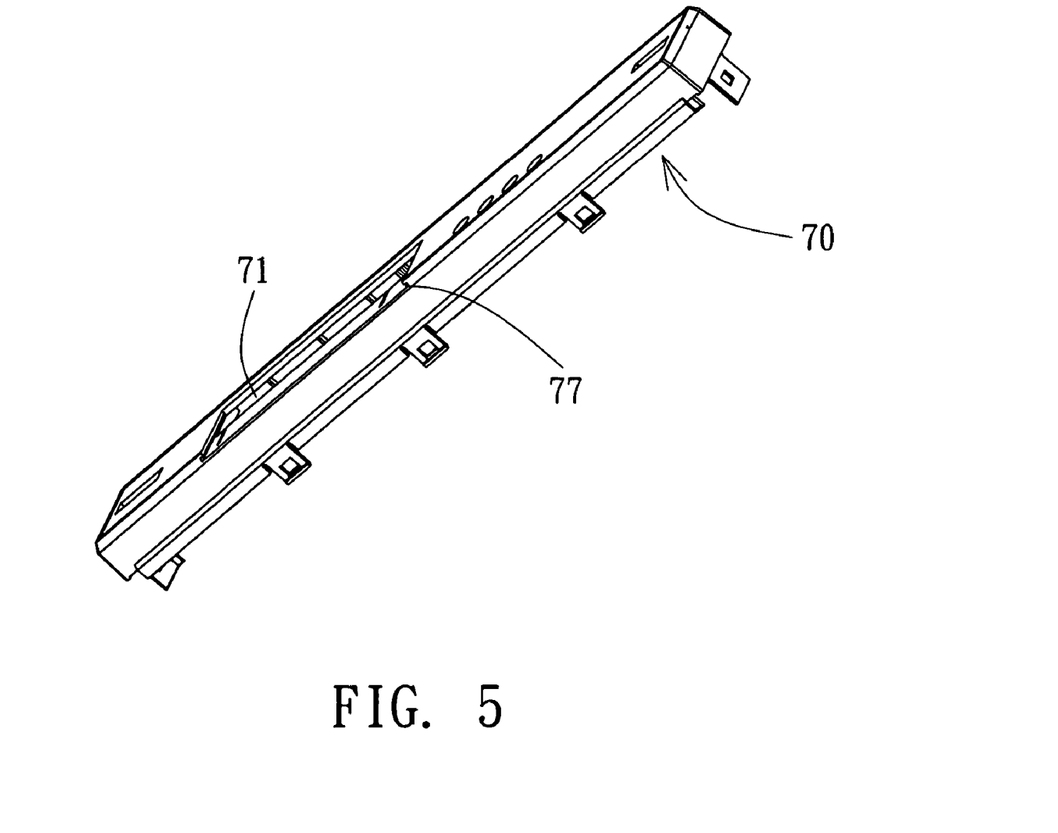
FIG. 5 is a partial upward view of the casing of an optical disc drive.

Referring to FIG. 5, a partial upward view of the casing of an optical disc drive is shown. In the optical disc drive 100, a groove 77 made on the casing 70 and positioned on the wall around the aperture 71. Referring to both FIG. 4 and FIG. 5, the baffler 73 further includes a flange 76, which complements the groove 77 of the casing 70. The groove 77 forms a sliding track for the baffler 73 which has a flange 73 to slide along, so that the aperture 71 can be smoothly opened or closed.

The Second Embodiment

Figure 6:
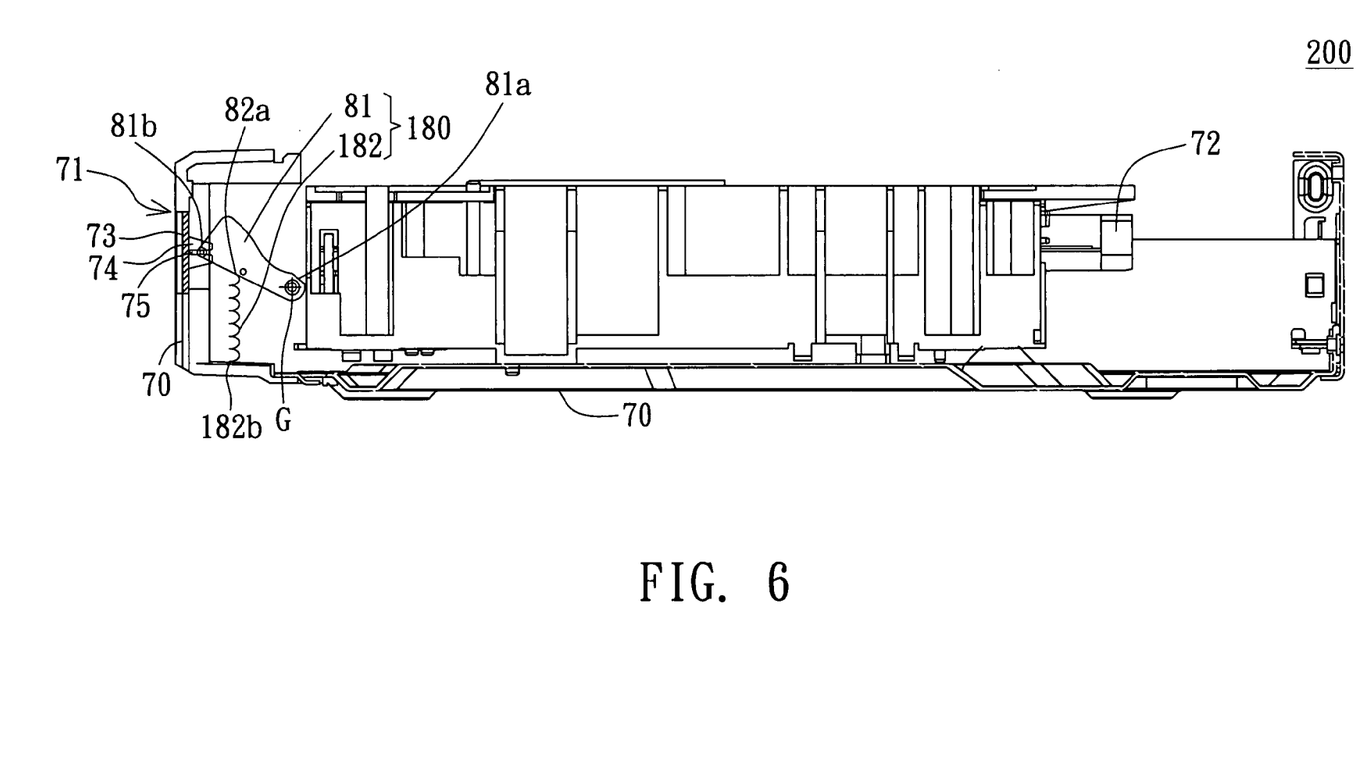
FIG. 6 is a side view of an optical disc drive according to preferred embodiment two of the invention.

Referring to FIG. 6, a side view of an optical disc drive according to the second embodiment of the invention is shown. The second embodiment differs from preferred embodiment one only in the way the elastic object is disposed. The element numbering still remains unchanged and is not repeated here. In FIG. 6, the elastic object 182 has a third end 182a and a fourth end 182b. The third end 182a of the elastic object 182 is fixed onto the second end 81b of the moveable piece 81, and disposed at a lateral side of the moveable piece 81, which has no contact with the tray 72, to provide a restoring force when the moveable piece 81 swings. The elastic object 182 is illustrated by example of a spring in the present embodiment. However, when it comes to practical application, other elastic elements such as a spring piece, a paper clip or a tensional spring can also be used to achieve the same effect.

Figure 7A:
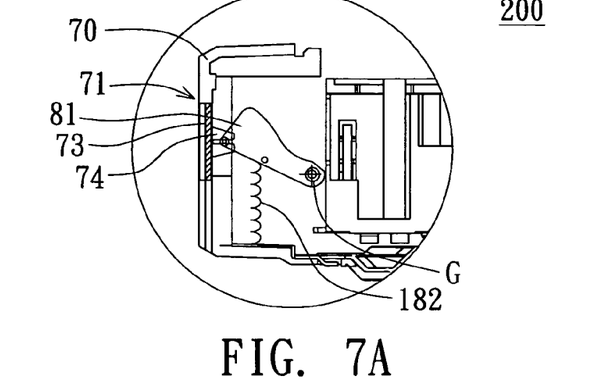
FIG. 7A is a partial view of the optical disc drive in FIG. 6 when a tray is disposed within an optical disc drive.
Figure 7B:
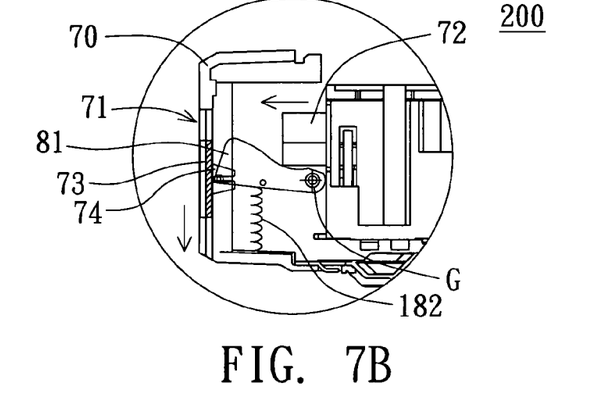
FIG. 7B is a partial view of the optical disc drive in FIG. 6 when the tray starts to be withdrawn from the optical disc drive.
Figure 7C:
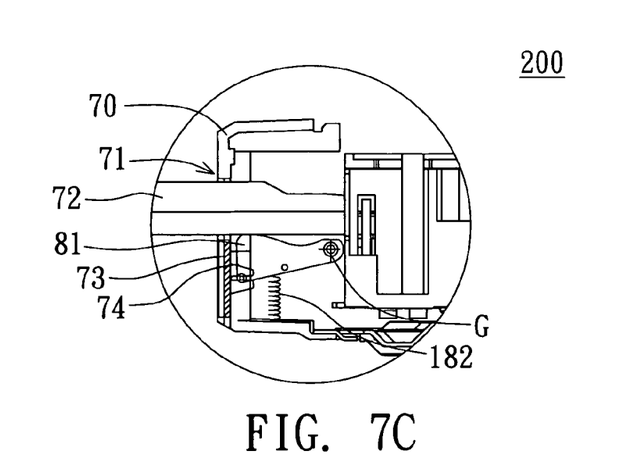
FIG. 7C is a partial view of the optical disc drive in FIG. 6 when the tray is disposed outside the optical disc drive.

Referring to FIG. 7A, a partial view of the optical disc drive in FIG. 6 when a tray is disposed within an optical disc drive is shown. In FIG. 3, the tray 72 is disposed inside the optical disc drive 200, while the moveable piece 81 is sustained by the elastic object 182, so that the baffler 73 which is pivotally connected to the moveable piece 81 is used for closing the aperture 71. Referring to FIG. 7B, a partial view of the optical disc drive in FIG. 6 when the tray starts to be withdrawn from the optical disc drive is shown. When the tray 72 is driven to move towards the aperture 71, the tray 72 touches and applies a force onto the moveable piece 81. Being pivotally connected to the internal of the casing 70, the moveable piece 81 uses the pivotal connection between the first end of the moveable piece 81a and the casing 70 as the supporting point G to swing downward. At the same time, the elastic object 182 is compressed, and the baffler 73 pivotally connected to the moveable piece 81 is moved to slide. By means of the movements of the moveable piece 81 and the elastic object 182, once the tray 72 starts to move away from the optical disc drive 200, the aperture 71 will be opened by the baffler 73. Referring to FIG. 7C, a partial view of the optical disc drive in FIG. 6 when the tray is disposed outside the optical disc drive is shown. When the tray 72 is moved outside the casing 70, a force provided by the tray 72 is continually applied onto the moveable piece 81. Meanwhile, the second end 81b of the moveable piece 81 reaches the maximum span of swinging, so that the elastic object 182 is compressed to the largest extent to carry the baffler 73 to slide to the lowest position. Consequently, the aperture 71 is totally opened allowing the tray 72 to be released from the aperture 71. When the tray 72 moves towards the internal of the optical disc drive 100, the tray 72 is gradually detached from the moveable piece 81 to release the compressed elastic object 82, providing a restoring force for the moveable piece 81 to swing so that the baffler 73 can swing back to the original position to close the aperture 71.

The springing device disclosed in the above embodiments of the invention uses a mechanic springing device as control element for the opening and closing of the aperture of an optical disc drive. Once the tray starts to move away from the optical disc drive, the tray will touch the springing device for the aperture to be opened automatically without resorting to any control signal sent by a control unit. Since the springing device according to the invention dispenses with the use of a drive motor and a gear box, which are not only expensive but also have a high failure rate, the manufacturing and maintenance costs are reduced and the lifespan can is prolonged.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A springing device disposed in an optical disc drive, wherein the optical disc drive comprises at least a casing, a tray and a baffler, the casing having an aperture, the tray moveably disposed in the casing and selectively driven for carrying an optical disc into or out of the casing through the aperture, the baffler disposed in the casing for opening or closing the aperture, the springing device comprising:
   a moveable piece having a first end and a second end, the first end of the moveable piece pivotally connected to an inner wall of the casing and the pivotal connection thereof used as a supporting point for the moveable piece to swing, the second end pivotally connected to the baffler; and
   an elastic object having a third end, a fourth end and a bow portion passing round the supporting point, the third end of the elastic object connected to the moveable piece, and the fourth end of the elastic object fixed at the casing;
   wherein when the tray is disposed within the optical disc drive, the moveable piece and the baffler are biased by the elastic object so that the baffler closes the aperture; and when the tray is driven to move towards the aperture and touch the moveable piece, the second end of the moveable piece is swung to move the baffler, so that the baffler opens the aperture, and a restoring force is provided by the elastic object for causing the moveable piece to swing back and the baffler to close the aperture.

2. The springing device according to claim 1, wherein the third end of the elastic object is fixed onto the second end of the moveable piece, and wherein when the tray is disposed within the optical disc drive, the elastic object sustains the second end of the moveable piece; and wherein when the tray is driven to move towards the aperture and touching the moveable piece, the second end of the moveable piece is swung to move the baffler and the elastic object is compressed so that a restoring force is provided for the moveable piece to swing back.

3. The springing device according to claim 1, wherein the elastic object is a spring.

4. The springing device according to claim 1, wherein the elastic object is an elastic plate.

5. The springing device according to claim 1, wherein the springing device comprises: a projecting piece, fixed on the baffler and pivotally connected to the second end of the moveable piece, and wherein the baffler is moved by the moveable piece to open or close the aperture.

6. The springing device according to claim 5, wherein the projecting piece is pivotally connected to the second end of the moveable piece via a slit jaw, the second end of the moveable piece moveably disposed in the slit jaw.

7. An optical disc drive, comprising:
   a casing having an aperture; a baffler, disposed in the casing for opening or closing the aperture;
   a tray, moveably disposed within the casing and selectively driven for carrying an optical disc into or withdrawn from the casing; a motor for driving the tray; and
   a springing device comprising:
   a moveable piece having a first end and a second end, the first end of the moveable piece pivotally connected to an inner wall of the casing and the pivotal connection thereof used as a supporting point for the moveable piece to swing, the second end of moveable piece pivotally connected to the baffler; and
   an elastic object having a third end, a fourth end and a bow portion passing round the supporting point, the third end connected to the moveable piece, and the fourth end fixed at the casing;
   wherein when the tray is disposed within the optical disc drive, the moveable piece and the baffler are biased by the elastic object so that the baffler closes the aperture; and when the tray is driven to move towards the aperture and touch the moveable piece, the second end of the moveable piece is swung to move the baffler, so that the baffler opens the aperture, and a restoring force is provided by the elastic object for causing the moveable piece to swing back and the baffler to close the aperture.

8. The optical disc drive according to claim 7, wherein the third end of the elastic object is fixed onto the second end of the moveable piece, and wherein when the tray is disposed within the optical disc drive, the elastic object sustains the second end of the moveable piece; and wherein when the tray is driven to move towards the aperture and touching the moveable piece, the second end of the moveable piece is swung to move the baffler and the elastic object is compressed so that a restoring force is provided for the moveable piece to swing back.

9. The optical disc drive according to claim 7, wherein the elastic object is a spring.

10. The optical disc drive according to claim 7, wherein the elastic object is an elastic plate.

11. The optical disc drive according to claim 7, wherein the optical disc drive comprises: a projecting piece, fixed on the baffler and pivotally connected to the second end of the moveable piece, and wherein the baffler is moved by the moveable piece to open or close the aperture.

12. The optical disc drive according to claim 7, wherein the projecting piece is pivotally connected to the second end of the moveable piece via a slit jaw.

13. The optical disc drive according to claim 7, wherein the casing further comprises a groove, positioned on the inner wall of the aperture and used for providing a sliding track for the baffler.

14. The optical disc drive according to claim 7, wherein the baffler further comprises a flange, complemented with the groove of the casing, so that the baffler is slide along the aperture.

* * * * *